Sept. 12, 1950 J. F. BLACK 2,522,426
METHOD OF EXTRACTING HYDROCARBONS
Filed May 30, 1945
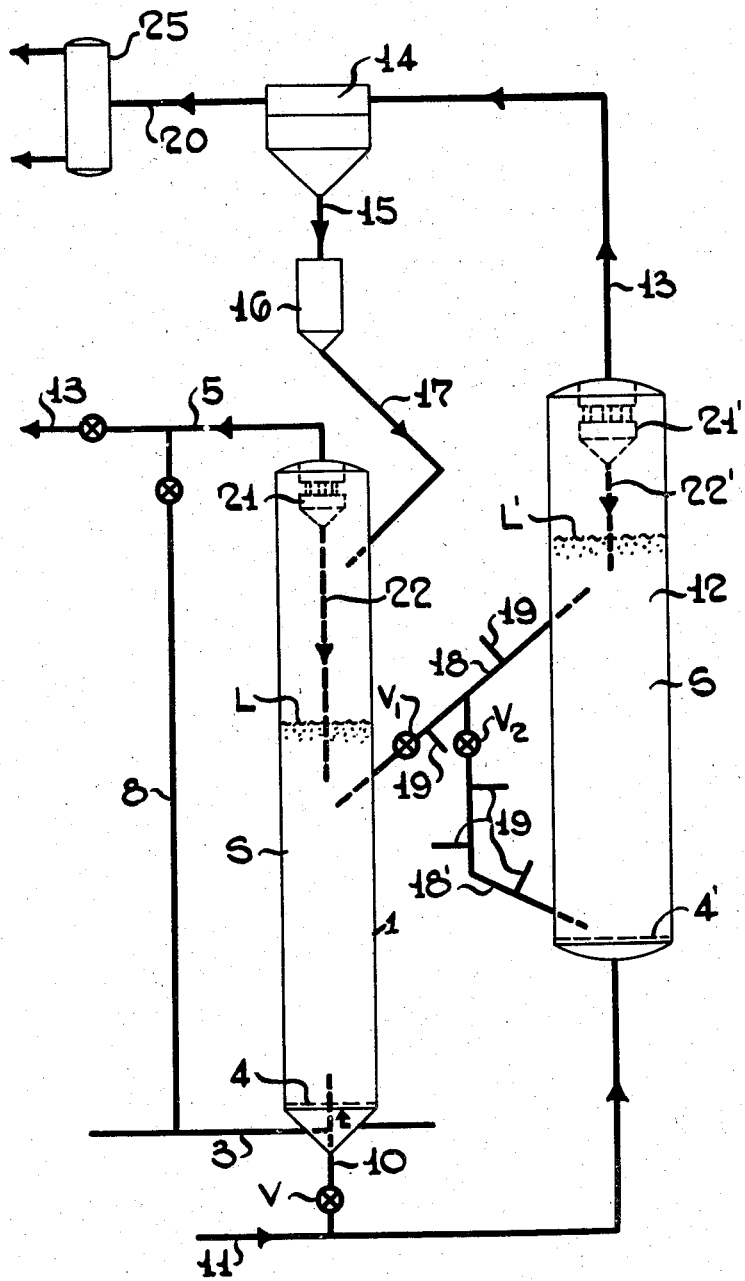
James F. Black Inventor
By Young Attorney Patented Sept. 12, 1950

2,522,426

UNITED STATES PATENT OFFICE 2,522,426

METHOD OF EXTRACTING HYDROCARBONS

James F. Black, Roselle, N. J., assignor to Standard Oil Development Company, a corporation of Delaware Application May 30, 1945, Serial No. 596,648

3 Claims. (Cl. 183—114.2)

The novel features of my invention are fully described in the following specification and claims considered in connection with the accompanying drawing.

The main object of my present invention is to provide a process for separating straight-chain paraffinic hydrocarbons and olefinic hydrocarbons as well as other types of hydrocarbons in a process which may be operated continuously, expeditiously, and cheaply.

A more specific object of my invention involves treating a mixture of paraffins such as gasoline to improve the octane rating thereof by removing or separating straight-chain paraffinic hydrocarbons.

Other and further objects of my invention will appear in the following more detailed description and claims.

In the accompanying drawing I have shown diagrammatically an apparatus layout in which a preferred modification of my invention may be carried into practical effect.

My process involves the separation of straight chain paraffins and/or olefins from other hydrocarbons with which they are mixed by causing the mixture to contact a fluidized mass of powdered solvent adsorbent material. The solid adsorbent material is prepared and activated as described in my co-pending application, Serial No. 537,529, filed May 22, 1944. In the said pending application, I have disclosed that a mixture of hydrous oxides of aluminum and silicon with a hydroxide or oxide of a group II metal of the periodic system, such as calcium oxide, is adapted to react together to form a substance exhibiting specific adsorption capacity for normal paraffins, if the said oxide and hydroxide mixture is heated, preferably with a solution of a salt of the group II element to a temperature in the range of from 0° C. to 500° C., preferably from about 220° C. to about 400° C. The material produced after dehydration by heating in vacuo, is adapted for removing n-paraffins from mixtures of isoparaffins, naphthenes and aromatics, and has the empirical formula based on the oxides: $4CaO.Al_2O_3.4SiO_2$.

My present invention is an improvement over that disclosed in the said prior co-pending application in that I have discovered means for operating the process on the same principle as a solvent extraction process works or operates except that in this instance the "solvent" is a "fluidized" solid which possesses substantially 100% selective adsorbability for straight-chain hydrocarbons as against other types of hydrocarbons.

As indicated previously, in my present process the adsorbent is prepared and activated as described in the said co-pending application and is then reduced to a powder having a particle size preferably of from 100–400 mesh.

Referring to the drawing, 1 represents a contacting zone which may be in the form of a cylindrical vessel having a conical base and a dome-shaped crown piece. The hydrocarbon mixture enters the contactor 1 through a line 3 and passes upwardly through a grid 4 where it contacts the adsorbent material S. The adsorbent material is maintained in the form of a dense turbulent fluidized mass or bed by controlling the upward velocity of the gases within the range of from about ½–5 feet per second. Under operating conditions which will be specified later, the mixture passes through the fluidized bed of contact material and the straight-chain hydrocarbons (paraffins and olefins) are adsorbed while the branch chain paraffins and olefins pass through the mixture unadsorbed and are withdrawn through a line 5. If desired, the material in 5, or a portion thereof, may be recycled through a line 8 to line 3 for further treatment in adsorber 1 while the material drawn off through line 13 contains the branch chain paraffins and olefins.

Meanwhile, the adsorbent material S, of course, acquires the straight-chain paraffins or olefins and then is withdrawn continuously through a line 10 projecting into the bottom of adsorber 1 above grid 4, and thence discharged into a stripping gas in line 11 to form a suspension which is carried into a regenerator or stripper 12. In stripper 12 by controlling the gas velocities as in 1 a dense fluidized bed or mass of adsorbent material in stripper gas is maintained, which dense suspension will have an upper level at L'. To aid in good distribution, a grid 4' is disposed in the bottom of stripper 12. In stripper 12 the stripping gas dislodges the adsorbed gases (the straight-chain paraffins and olefins) and these, that is, the hydrocarbons and the stripping gas, pass overhead from the stripper through line 13, thence pass through one or more separators such as electrical separators 14 where the last traces of adsorbent material are removed, which adsorbent material discharges via line 15 into receiver 16 and eventually through line 17 into the adsorption zone 1.

It will be understood that in both the adsorption zone and the stripping zone above the dense phases which have upper levels at L and L' respectively, the concentration of adsorbent material in gas drops sharply so that from either zone there issues the gas very depleted of entrained solids. In both zones, I preferably dispose a number of cycle separators 21 (in contacting zone 1 and 21' in stripping zone 12) for the purpose of removing entrained solids, which solids are returned by dip pipes 22 and 22' respectively, to the dense phase in adsorption zone 1 and stripping zone 12.

By positioning or disposing the stripper 12 vertically above the adsorption zone 1, I may secure a natural flow of solids from the stripper 12 to the adsorption zone 1 through line 18. It is advisable to dispose a plurality of taps 19 in line 18 through which a gas may be allowed to enter to increase the flowability of the solids, thus avoiding plugging, bridging, and other undesirable effects in this transfer line. In order to control residence time in adsorption zone 1, I provide a flow control valve V which is disposed in line 10 and by manipulation of said valve, I may control the rate at which solid material is withdrawn from the adsorption zone. Similarly, in line 18 I provide a flow control valve V' which also controls the flow rate of material flowing in line 18.

Also, in the event that it is necessary, I may recycle a portion of the material in line 18 via line 18' to stripper 12 by manipulation of V₂.

The gaseous material withdrawn from separator 14 through line 20 is discharged in receiving drum 25, said material, of course, being the straight-chain hydrocarbons.

As to operating conditions, the following give good results. In the adsorption zone the temperature may be from 200°–600° F. and the pressure from 1–100 atmospheres. Of course, the composition of the feed will determine the conditions which must be employed, but in separating normally gaseous straight-chain hydrocarbons from normally gaseous branch-chain hydrocarbons, the foregoing conditions will give good results. It should be pointed out, however, that the stripper 12 should be operated at temperatures 200° to 500° F. higher than those prevailing in adsorption tower 1 and that the pressures in the stripper or desorber should be about the same as those in tower 1 or somewhat lower. The stripping gas used may be steam, nitrogen, hydrogen, methane, carbon dioxide, or any other non-oxidizing gas. In the adsorption tower 1 a contact time of 15 seconds to 5 minutes could be employed but usually the contact time is within the range of from 30 seconds to 3 minutes. In the regenerator 12 a contact time of 1–20 minutes, preferably 10–15 minutes, may be employed. As to recycle ratio, it is important in respect to the recycling of adsorbent back to the desorber 12 after it has passed through the latter once, for it is desirable to discharge into adsorber 1 the material which is substantially completely desorbed. Of course, it may be desirable to recycle a portion of the material in line 10 before it is mixed with the stripping gas back to the adsorber 1, but ordinarily this is not advisable. However, it may be desirable to recycle off gas in line 5 back to the bottom of adsorber 1 to remove further quantities of straight-chain paraffins or olefins therefrom. Referring again to the recycling of solids back to the desorber 12, good results are obtained by recycling about 50% of the material in line 18 back to the desorber 12 and to feed to desorber 12 an equal quantity of solid material through line 11.

Numerous modifications of my invention may be made by those familiar with this art.

What I claim is:

1. A continuous method of separating a gaseous hydrocarbon from a gaseous mixture thereof with other hydrocarbons by selective adsorption, which comprises flowing downwardly into an intermediate part of a vertical elongated adsorption zone a stream of solid powdered adsorbent which has selective adsorbability for said hydrocarbon to be separated, continuously feeding the gaseous hydrocarbon mixture into a lower part of said adsorption zone, forcing said gaseous hydrocarbon mixture to pass upwardly through said adsorption zone at a sufficient velocity to form a dense phase fluidized mass of the powdered adsorbent having a dense phase upper level, contacting the gaseous hydrocarbon mixture with the powdered adsorbent in said fluidized mass to selectively adsorb the gaseous hydrocarbon which is to be separated, continuously removing unadsorbed gaseous hydrocarbons of said mixture from the adsorption zone above said dense phase level, continuously withdrawing the powdered adsorbent on which the hydrocarbon to be separated is adsorbed from a bottom part of said fluidized mass and forcing the thus withdrawn powdered adsorbent by a stream of inert stripping gas into a lower portion of a desorption zone wherein the powdered adsorbent again forms a dense fluidized mass having a dense phase upper level as the adsorbed gaseous hydrocarbon is stripped from the powdered adsorbent by said stripping gas passing upwardly through the dense fluidized mass of powdered adsorbent in the desorption zone, withdrawing the desorbed gaseous hydrocarbon and stripping gas from the desorption zone above the dense phase upper level therein, maintaining the dense phase upper level in said desorption zone substantially above the dense phase upper level in said adsorption zone, and withdrawing a stream of the fluidized powdered adsorbent depleted of the gaseous hydrocarbons that had been adsorbed thereon from an upper part of the fluidized mass in the desorption zone to form said stream of powdered solid adsorbent material flowing downwardly into an upper part of the dense phase fluidized mass within the adsorption zone.

2. In the continuous method defined by claim 1, the gaseous hydrocarbon separated by being selectively adsorbed is a straight-chain hydrocarbon, and the other hydrocarbons in the gaseous mixture which are not adsorbed, are branched-chain hydrocarbons.

3. The method according to claim 1 in which the adsorbent material has the empirical formula: $4\ CaO.Al_2O_3 . 4\ SiO_2$.

JAMES F. BLACK.

REFERENCES CITED

The following references are of record in the file of this patent:

UNITED STATES PATENTS

| Number | Name | Date |
|---|---|---|
| 1,577,534 | Miller | Mar. 23, 1926 |
| 2,270,903 | Rudbach | Jan. 27, 1942 |
| 2,273,075 | Weems | Feb. 17, 1942 |
| 2,306,610 | Barrer | Dec. 29, 1942 |
| 2,344,449 | Ogorzaly | Mar. 14, 1944 |
| 2,384,311 | Kearby | Sept. 4, 1945 |
| 2,396,709 | Leffer | Mar. 19, 1946 |
| 2,420,542 | Jahnig | May 13, 1947 |
| 2,442,191 | Black | May 25, 1948 |

FOREIGN PATENTS

| Number | Country | Date |
|---|---|---|
| 118,399 | Australia | Feb. 26, 1943 |